March 17, 1953 — W. K. LEWIS — 2,631,934
METHOD OF MANUFACTURING A GAS RICH IN CARBON MONOXIDE
Filed April 3, 1946
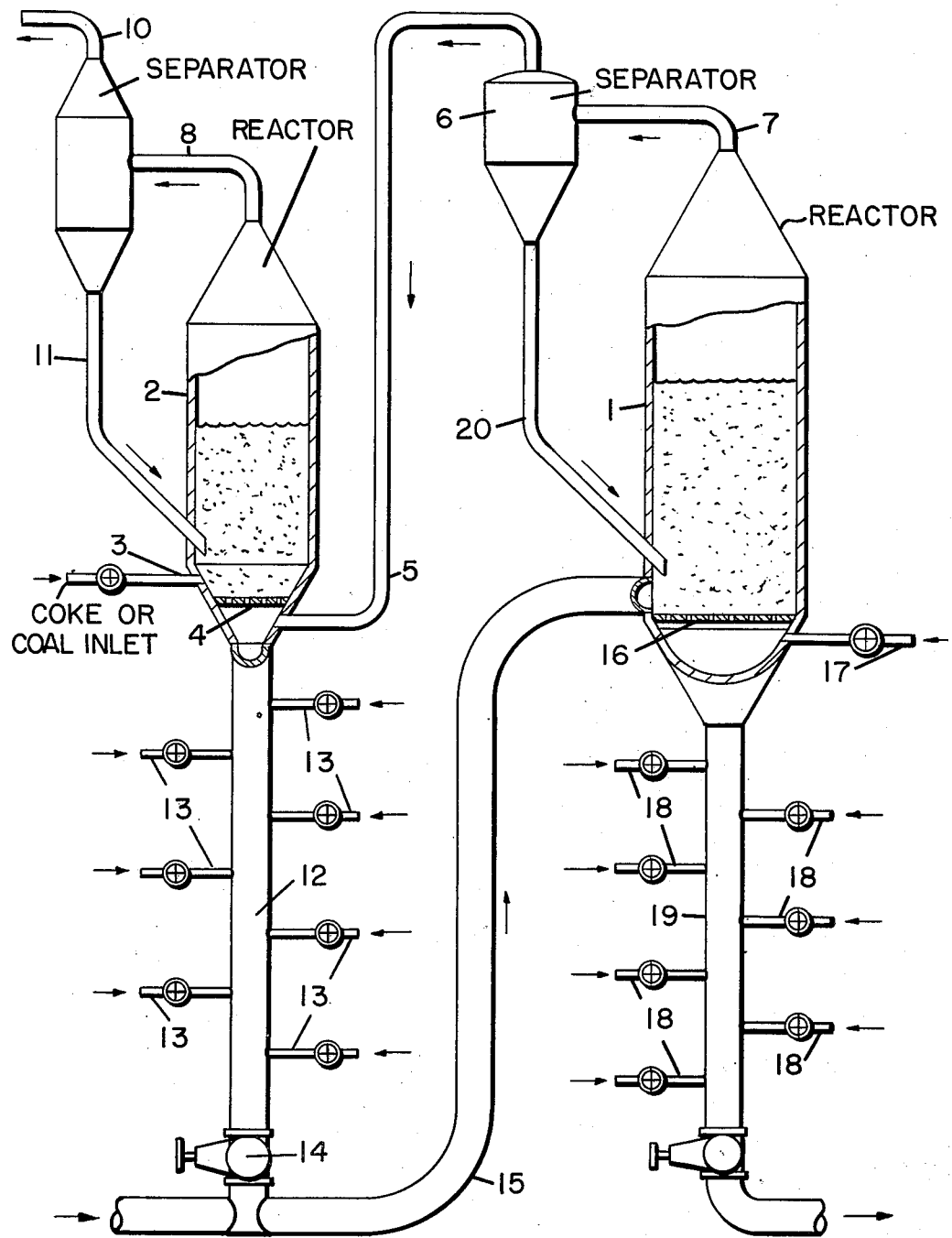
Warren K. Lewis Inventor
By J. Cashman Attorney

UNITED STATES PATENT OFFICE 2,631,934

METHOD OF MANUFACTURING A GAS RICH IN CARBON MONOXIDE

Warren K. Lewis, Cambridge, Mass., assignor to Standard Oil Development Company, a corporation of Delaware Application April 3, 1946, Serial No. 659,408

5 Claims. (Cl. 48—206)

The present invention is directed to an improved process for the production of producer gas or any other synthetic gas mixture derived from coal, coke or similar carbonaceous material by controlled combustion thereof. For ease of description the following discussion will be directed to producer gas.

In the production of producer gas many complications are encountered. These complications render the process expensive, impress limitations on the capacity of a given unit and restrict the process to selected coals or cokes, in the sense that they must have fusing or clinkering temperatures above a certain minimum. These complications arise mainly out of the thermal character of the reactions involved.

Using coke as an illustration, the overall reaction is (A) $\quad 2C + O_2 \rightarrow 2CO + 58{,}000$ Cals.

In order to avoid temperature runaway it is common practise to add steam to the reaction giving (B) $\quad C + H_2O \rightarrow CO + H_2 - 30{,}000$ Cals.

Now actually Reaction A proceeds in two steps as follows:

(C) $\quad C + O_2 \rightarrow CO_2 + 97{,}000$ Cals.

and (D) $\quad CO_2 + C \rightarrow 2CO - 39{,}000$ Cals.

Reactions B, C and D increase in rate with temperature, but at any given temperature B and D proceed at about the same rate while C goes at a far more rapid rate. It is this relationship between these reactions which gives rise to the aforesaid complications.

For example, in an ordinary gas producer, using a fixed bed of coke, the entering air reacts with the hot coke at the bottom of the bed according to Reaction C. At this point the temperature becomes excessive, often exceeding 2800° F. Unless a particularly high melting coke is employed, clinkering occurs at this point. To minimize this effect, steam is introduced at this point, but, as a mere absorber of heat, steam is inefficient and wasteful.

As the gases pass up through the bed, the oxygen disappears, and Reactions B and D occur. These absorb large quantities of heat and cool the bed to a point where these reactions progress very slowly. The excessive heat at the bottom of the bed does not relieve this condition because the bed is a poor conductor of heat.

Thus it will be clear that in an ordinary gas producer utilizing a fixed bed the conditions which are inherent in the operation are quite the reverse of what is desired. At the bottom, where the reaction proceeds very rapidly, the temperature becomes too high, causing clinkering and shutdowns. At the top, where heat is wanted to support the endothermic reactions, it is not available and the temperature drops to a point where the reduction of $CO_2$ and $H_2O$ to CO and H is incomplete, yielding an undesirable or inferior gas.

To alleviate this situation, the so-called "jiggling" technique has been resorted to. This has a tendency to make conditions throughout the bed uniform. But this is not an unmixed blessing. While it does serve the purpose of making available some of the heat of reaction of Reaction C for B and D, it also reduces the effective carbon concentration throughout the bed. The rates of all these reactions decrease with decrease in carbon concentration. On the other hand, if the operation is to be economical, a low carbon ash must be withdrawn. A compromise must therefore be made between maintenance of a sufficiently high carbon concentration in the bed to support reaction and maintenance of low carbon in the ash. Of necessity the result is a sacrifice of reaction rate and a waste of carbon in the ash. Consequently, the carbon utilization efficiency of a unit using this technique is low.

According to the present invention, the dilemma presented by an operation of this type is resolved by the utilization of two separate reaction zones which, in effect, readjust the reaction conditions in a manner best calculated to provide the preferred conditions for the individual reactions involved. It involves a rearrangement of the operations so as to make maximum carbon available during the reducing stage and a depleted but controllable carbon concentration available in the oxidation stage. It makes possible adequate temperature control in the respective stages, complete reduction of $CO_2$ and $H_2O$ resulting in higher heating value of the product gases and higher thermal efficiency of the unit, as a whole, and maximum utilization of carbon with consequent low-carbon ash.

Briefly, the present invention contemplates partial performance of Reaction C in a separate zone which may be considered a carbon cleanup zone to which carbonaceous material is fed from a separate reduction zone in which Reactions B and D and the residue of Reaction C are performed. Since objects of the present invention are to insure uniformity of reaction temperature, and reaction mixture in the respective zones and adequate heat balance in the reduction zone at high temperature levels to effect complete reduction of $CO_2$ and $H_2O$ to eliminate the clinkering which might attend operations at the temperature levels desired, maintenance of the carbonaceous material in the separate stages in a fluidized condition is a feature thereof. Likewise, since it is desired to maintain different carbon concentrations in the separate zones, a physical separation thereof is necessary. In other words, the objective cannot be achieved simply by flowing the carbonaceous material downwardly through a vessel and flowing the gases countercurrent to it.

It is, in fact, an essential feature of this invention that Reaction C be only partially performed in the carbon cleanup zone. If complete performance of this reaction in this zone were effected the temperature would be fatally excessive. Furthermore, it is desired to maintain the reduction zone at the maximum permissible temperature and this is most conveniently done by counterbalancing the heat absorption of the reducing Reactions B and D occurring therein by the heat evolved by the completion of Reaction C in said zone.

The nature of the present invention will appear more clearly from the following detailed description of the accompanying drawing, in which the single figure is a front elevation in diagrammatic form of one type of plant suitable for the practise thereof.

Referring to the drawing in detail, numeral 1 designates a reaction vessel in which the first stage of the reaction is performed while numeral 2 indicates the reactor for the second stage. The carbonaceous material, in this case coke, is introduced into the bottom of reactor 2 through line 3, preferably over a grid or grate 4 in the manner usual in operations using a fluidized solid. The carbonaceous material is preferably in finely divided form so as to be susceptible to fluidization. A suitable size is one in which all particles will pass 10 mesh, with the particle sizes graduated so that a large percentage, say 50%, will pass 40 mesh. Of these smaller particles, a substantial proportion should be not more than about 60 microns in diameter. Particles much larger than 10 mesh may be tolerated, say up to ¼ inch, but in this case the percentage of fines should be suitably adjusted so as to insure fluidization. The ground material may be fed in through a screw conveyer or through a valve controlled pipe to which is connected a standpipe containing the ground material in a fluidized state, said standpipe being connected to a hopper in the usual manner. The particle size distribution is that obtaining in the reaction zone which will, in general, include a greater percentage of fines than the feed because of consumption of solid by reaction and attrition.

Gas is introduced into the bottom of reactor 2 by way of line 5 which carries off gas from a cyclone separator, or other separator of gases and solids, 6, which in turn receives a mixture of gas and solid from reactor 1 through line 7.

The gas carried by line 5 is the product of Reaction C in reactor 1. When using air for combustion, it may contain from 5 to 10% by volume of $CO_2$ and 10 to 16% by volume of oxygen, depending on the solid and gas feed to reactor 1. A substantial amount of oxygen is maintained in line 5, however, to provide adequate heat in reactor 2. Gas is introduced through line 5 at a rate sufficient to effect fluidization of the ground carbonaceous material in reactor 2. Ordinarily, the gas velocity through reactor 2 will be between about .5 and 5 feet per second, the particular velocity depending on the particle size and particle size distribution of the fresh solid feed.

In reactor 2, Reactions B and D predominate and Reaction C is completed. The gas leaving this reactor is mainly CO and $H_2$ aside from nitrogen. When ground coal is used, this gas is enriched with hydrocarbons and this is desired in fuel gas. In such case this gas may be processed for the recovery therefrom of any such hydrocarbons desired. This gas carrying fine solids is fed by way of line 8 into a cyclone or other separator 9 from which the free gas leaves by line 10 while recovered solids are returned to the reactor through line 11.

The minimum gas velocity in reactor 2 is that sufficient to give the necessary turbulence to achieve the purpose of the invention. As gas velocity is increased above this minimum the tendency is for the solid density in the reactor to be reduced by reason of carryover of solids by the gas. However, if solids are fed into the reactor at a high rate, this reduction in density due to high gas velocity is less. This is made possible by recycling of solids from cyclone separator 9. The maximum gas velocity is that which will maintain satisfactory solids concentration in reactor 2 with recycle of solids from separator 9. This procedure allows high maximum capacity together with a wide range in capacity while still maintaining good operating conditions.

Partially spent, carbonaceous material leaves the bottom of reactor 2 by way of standpipe 12. This pipe is provided with a plurality of injection ports or nozzles 13 for the injection of small amounts of fluidizing gas to maintain the solids in the pipe in fluidized condition. It is convenient to use steam for this purpose.

At the bottom of the standpipe is a control element 14 which may be a suitable slide valve, star wheel or other device for controlling the flow of a fluidized solid. This solid is discharged into a flow line 15 by which it is conducted to the bottom of reactor 1 where it is introduced above a grid or grate 16. Some steam may be introduced into line 15, as indicated, as well as at points therealong, to facilitate the transfer of the fluidized solid.

The full requirement of air for the process is preferably introduced into the bottom of reactor 1 below the grid through line 17. It is introduced at a rate sufficient to maintain the solids in reactor 1 in a fluidized condition. Again, the velocity of air through this reactor will in general be between about .5 and 5 feet per second. Usually, however, it will be somewhat lower than the velocity in reactor 2. This is because the average particle size of the solids fed in by line 3 becomes smaller in reactor 2 because of attrition and reaction and, in addition, fine ash builds up in reactor 1 as will hereinafter appear.

Some steam may be admitted with the air in line 17 to assist in temperature control in reactor 2. Much of this may be brought in by line 15. Further quantities of steam and/or air will be introduced into the process by way of jets 18 arranged around standpipe 19, into which ash from reactor 1 falls. This ash is maintained in fluidized state in pipe 19 to prevent plugging and to facilitate removal.

The reaction gas containing ash leaves the top of reactor 1 through line 7 which discharges into separator 6. The ash is fed back from the separator to reactor 1 by line 20. With respect to this feature, the same advantages of increased capacity and flexibility obtain as with respect to the solid recycle in reactor 2.

In operating the process heretofore described, the temperature in reactor 1 is maintained between about 1500° and 2500° F., usually between about 1700° and 2200° F. It is preferred to operate at the highest temperature which the ash will tolerate without sintering. The temperature in reactor 1 is controlled by controlling the amount of carbon admitted through line 15. The amount of air admitted to reactor 1 as before indicated is the total required for ultimate gas production. Thus, it is in excess of that required to react with all the carbon admitted through line 15. As a result, temperature in reactor 1 is controlled solely by manipulation of valve 14, thereby controlling the carbon supply. Localized runaway temperature in this reactor is practically eliminated both because of the uniform distribution of the carbon throughout the reactor and because of the large amount of ash present. The level of the fluidized solid in this reactor is controlled by the rate of bottom ash withdrawal. This level is, of course, also a function of the gas velocity through this reactor. The level maintained is that providing the maximum capacity of reactor 1, taking into account the gas velocity through the reactor and the overhead ash.

In reactor 2 the temperature maintained may be, in general, of the same order of magnitude as that in reactor 1. It is often desirable, however, depending upon the character of the carbonaceous material, to maintain a lower temperature level in reactor 2 than in reactor 1 because in this reactor the predominant condition is reduction and the sintering point of some ashes is greatly lowered under reducing conditions. Thus, where the temperature in reactor 1 is maintained between about 2000° and 2400° F. the temperature in reactor 2 may be maintained in the range of about 1500° to 2000° F.

The temperature in reactor 2 is controlled by regulating the steam supply to reactor 1. Obviously, since all the air required for the process is supplied to reactor 1 and the temperature in this reactor is controlled by the carbon supply, the latter will have an effect on reactor 2 unless the steam supply is adequately adjusted. If the permissible carbon supply to reactor 1 is such that a large percentage of oxygen remains in the gas fed to reactor 2, the steam supply must be increased. The oxygen contained in the gas fed to reactor 2 will generate heat in this reactor but because of the fluidized condition of the solid in this reactor this heat will be uniformly distributed and will be readily absorsed by Reactions B and D. In some cases where the carbon supply to reactor 1 is limited so as to leave a large residue of oxygen in the feed gas to reactor 2 auxiliary steam may be supplied to line 5 where a deficiency cannot be made up through nozzles 13.

The controls in this process are as follows:

1. The rate of gas produced by the unit as a whole by the rate of air supply to reactor 1,
2. Solids in reactor 1 by the ash withdrawal from this reactor,
3. Temperature in reactor 1 by rate of carbon supply through valve 14,
4. Quantity of powder in reactor 2 by fresh carbonaceous material supplied,
5. Temperature in reactor 2 by rate of steam supply.

It is a particular advantage of the process of the present invention that a high carbon concentration is provided in the reduction zone, thereby favoring high reduction rates in this zone while absolute temperature control is maintained independently in both zones.

In an ordinary gas producer the top bed temperature falls to 1400–1500° F., or even less occasionally, at which temperature the reduction rate is very low. It will be remembered that the reduction rate approximately doubles with every increment of 100° F. in temperature. In the process of the present invention it is possible to hold the reduction temperature at higher levels up to and exceeding 2200° F. where the ash will tolerate it.

It is a further advantage that in the oxidation zone the consumption of carbon can be carried to a greater extent than is usually the case without creating difficult problems of temperature control. In other words, the process makes possible the production of a lower carbon ash than hitherto attainable.

Another and highly important advantage of the present invention is that the reduction reactions can be carried to completion leaving the product gas substantially free of undesirable $CO_2$ and $H_2O$. Furthermore, because of the turbulence in the reduction reactor the formation of tar, where coal or similar material is employed as fresh feed, is greatly reduced.

These and other advantages are the direct results of the basic principles of operation involved in the process of the present invention according to which suitable carbon concentrations are maintained in the respective zones with independent control of the temperatures in these zones. Actually, the present invention reverses the order of the conventional producer gas operation to provide a sequence in which the materials undergoing treatment can be subjected to treatment under conditions best suited for their most economical consumption while at the same time providing adequate temperature control in the various stages of the operation.

The nature and objects of the present invention having been thus described and illustrated, what is claimed as new and useful and is desired to be secured by Letters Patent is:

1. The method of manufacturing a gas rich in carbon monoxide from solid carbonaceous material, which comprises contacting powdered carbonaceous material at a temperature of from about 1500°–2000° F. in the form of a dense fluidized mass in a gas producing zone with a feed gas containing carbon dioxide, steam and free oxygen for a sufficient period substantially completely to reduce $CO_2$ and steam present in said zone by the carbon of said carbonaceous material at said temperature, maintaining the free oxygen content of said feed gas sufficiently high to maintain said temperature by combustion in said zone, withdrawing a product gas rich in carbon monoxide and substantially free of carbon dioxide and steam from said zone, withdrawing carbonaceous material from said zone, charging it to a second physically separated zone, maintaining the carbonaceous material in said second zone in the form of a dense fluidized mass, passing a combustion-supporting gas containing steam and sufficient free oxygen to provide the desired composition in said feed gas upwardly through said second zone, maintaining a temperature between about 1500° and 2500° F. in the second zone adequate for the combustion of carbon and higher than said first-named temperature but below the sintering temperature of the resultant ash, withdrawing hot gases from said second zone and discharging them into said first-named zone to supply said feed gas thereto, and withdrawing ash from said second zone.

2. A method according to claim 1 in which the velocity of the gas through said first zone is sufficient to carry off overhead part of the finely divided material and said finely divided material is recovered from the off gas from said first zone and recycled to said first zone.

3. A method according to claim 1 in which the carbon concentration in said second zone is adjusted by recycling ash to said zone.

4. A method according to claim 1 in which the carbonaceous material has a particle size such that substantially all of it passes 10 mesh and contains particles of various sizes of which the predominant amount passes 40 mesh and the gas velocity in said zones is between about .5 and 5 ft./second.

5. The method set forth in claim 1 which is further characterized in that sufficient carbonaceous material is fed to the second zone from the first zone to maintain the desired temperature in said second zone, and is still further characterized in that the temperature in the first zone is maintained at the desired level by varying the amount of steam fed to the second zone.

WARREN K. LEWIS.

REFERENCES CITED

The following references are of record in the file of this patent:

UNITED STATES PATENTS

| Number | Name | Date |
|---|---|---|
| 1,033,127 | Singmaster | July 23, 1912 |
| 1,687,118 | Winkler | Oct. 9, 1928 |
| 1,840,649 | Winkler et al. | Jan. 12, 1932 |
| 1,937,552 | Davis | Dec. 5, 1933 |
| 1,955,025 | Sabel et al. | Apr. 17, 1934 |
| 2,367,281 | Johnson | Jan. 16, 1945 |
| 2,444,990 | Hemminger | July 13, 1948 |
| 2,480,670 | Peck | Aug. 30, 1949 |

FOREIGN PATENTS

| Number | Country | Date |
|---|---|---|
| 286,404 | Great Britain | Mar. 8, 1928 |
| 296,751 | Great Britain | Sept. 3, 1928 |
| 564,870 | Germany | Nov. 24, 1932 |

OTHER REFERENCES

Morgan: "American Gas Practise," 2nd edition, 1931, vol. I, pages 874–875.

Haslam et al.: "Fuels and Their Combustion," 1927, page 154.